(12) United States Patent
Gai et al.

(10) Patent No.: US 6,937,287 B2
(45) Date of Patent: Aug. 30, 2005

(54) VIDEO PROCESSING APPARATUS AND METHOD

(75) Inventors: Toshihiro Gai, Tokyo (JP); Yoshiaki Okuno, Tokyo (JP); Jun Someya, Tokyo (JP); Masaki Yamakawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 700 days.

(21) Appl. No.: 10/105,413

(22) Filed: Mar. 26, 2002

(65) Prior Publication Data

US 2003/0086020 A1 May 8, 2003

(30) Foreign Application Priority Data

Nov. 5, 2001 (JP) ........................................ 2001-338916

(51) Int. Cl.[7] ................................................ H04N 5/68
(52) U.S. Cl. ........................ 348/379; 348/655; 315/383; 382/274
(58) Field of Search ................................ 348/377–380, 348/678, 655–656, 686–690, 695–697, 672, 673; 315/383; 382/162, 167, 274; 358/504, 516, 520, 529

(56) References Cited

U.S. PATENT DOCUMENTS

| | | | | |
|---|---|---|---|---|
| 4,554,582 A | * | 11/1985 | Wine ........................... | 348/510 |
| 4,670,775 A | * | 6/1987 | Faroudja et al. ............. | 348/621 |
| 4,694,355 A | * | 9/1987 | Constable .................... | 386/42 |
| 4,811,101 A | * | 3/1989 | Yagi ............................ | 348/696 |
| 5,262,862 A | * | 11/1993 | Sadamatsu et al. .......... | 348/679 |
| 5,294,986 A | * | 3/1994 | Tsuji et al. .................. | 348/672 |
| 5,361,145 A | * | 11/1994 | Hasegawa .................... | 358/514 |
| 5,416,533 A | * | 5/1995 | Kageyama .................. | 348/673 |
| 5,515,113 A | * | 5/1996 | Takeshima .................. | 348/687 |
| 5,691,827 A | * | 11/1997 | Kamei et al. ................ | 358/530 |
| 5,748,773 A | * | 5/1998 | Tashiro et al. .............. | 382/169 |
| 5,892,337 A | * | 4/1999 | Van Den Broeke ......... | 315/383 |
| 5,920,351 A | * | 7/1999 | Takeshima et al. ......... | 348/379 |
| 6,069,660 A | * | 5/2000 | Sato ........................... | 348/379 |
| 6,097,445 A | * | 8/2000 | Goto et al. .................. | 348/655 |
| 6,204,882 B1 | * | 3/2001 | Sowig ........................ | 348/380 |
| 6,529,247 B2 | * | 3/2003 | Tagomori et al. ........... | 348/657 |
| 6,556,254 B1 | * | 4/2003 | Palmero ..................... | 348/678 |
| 2002/0017868 A1 | * | 2/2002 | Blanc ......................... | 315/1 |

FOREIGN PATENT DOCUMENTS

JP 2787494 6/1998

\* cited by examiner

*Primary Examiner*—Paulos M. Natnael
(74) *Attorney, Agent, or Firm*—Birch, Stewart, Kolasch & Birch, LLP

(57) ABSTRACT

In order to reduce the total capacity of a ROM used for adjustment of the black level and the white level of a digitized luminance signal for a television receiver, for example, a comparator compares the input luminance signal with a predetermined threshold value, a NOT gate inverts the input luminance signal, a first switching unit selects the input luminance signal or the output of the NOT gate, a ROM outputs an adjustment characteristic signal responsive to the output of the first switching unit, a multiplier multiplies the output of the ROM by a weighting signal and outputs the result of the multiplication as an adjustment value, a subtractor subtracts the adjustment value from the input luminance signal, an adder adds the adjustment value to the input luminance signal, and a second switching unit selects the output of the subtractor or the output of the adder.

10 Claims, 13 Drawing Sheets

FIG.13

TABLE 1

| BKPCNT OR WHPCNT | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| BKHS [IRE] | 50 | 44 | 40 | 36 | 33 | 31 | 29 | 27 | 25 | 24 | 22 | 21 | 20 | 19 | 18 | 17 |
| WHHS [IRE] | 50 | 56 | 60 | 64 | 67 | 69 | 71 | 73 | 75 | 76 | 78 | 79 | 80 | 81 | 82 | 83 |

VIDEO PROCESSING APPARATUS AND METHOD

BACKGROUND OF THE INVENTION

1. Field of the Invention

The present invention relates to a method and apparatus for adjusting the black level and white level of the luminance component of a digitized picture signal in a television receiver or the like.

2. Conventional Art

In a television picture with few black areas, the black areas tend to stand out from their surroundings. This is undesirable. To prevent this effect, it is known to adjust the black level as shown in FIG. 12. In FIG. 12, the horizontal axis represents the input luminance signal, and the vertical axis represents the output luminance signal. The straight line indicates the input-output characteristics without adjustment, and curves indicate input-output characteristics with adjustment. By the adjustment of the input luminance signal as shown in the range below 50 [IRE] of the input, the difference between the darkest part and the adjacent part (which is a little brighter than the darkest part) becomes smaller, so as to prevent the darkest part from standing out. This adjustment is also called stretching since the black parts (except the part of the lowest brightness) are moved farther away from the central value (50 [IRE]). Incidentally, the letters IRE indicate the amplitude scale standardized by the Institute of Radio Engineers.

By making similar adjustment in the range above 50 [IRE of the input, white level adjustment can be achieved.

To realize the non-linear characteristics shown by FIG. 12, ROMs are often used. However, the capacity of the ROMs tend to be very large.

SUMMARY OF THE INVENTION

An object of the present invention is to realize black level and white level adjustment by means of digital circuits without increasing the capacity of ROMs used.

According to the invention, there is provided a video processing apparatus including a comparator, a NOT gate, a first selector, a ROM, a first multiplier, a subtractor, a first adder and a second selector. The comparator compares a digitized input luminance signal with a predetermined threshold value. The NOT gate inverts the input luminance signal. The first selector selects the input luminance signal or the output of the NOT gate, in accordance with the result of the comparison at the comparator. The ROM generates an adjustment characteristic signal based on the signal output from the first selector. The first multiplier multiplies the adjustment characteristic signal from the ROM with a weighting signal supplied from the outside, to produce an adjustment value. The subtractor determines the difference between the input luminance signal and the adjustment value. The first adder determines the sum of the input luminance signal and the adjustment value. The second selector selects the output of the subtractor or the output of the first adder, in accordance with the result of the comparison at the comparator. At least one of black and white levels of the input luminance signal is thereby adjusted.

For instance, when the comparator finds that the input luminance signal is not larger than the threshold value, the first selector selects the input luminance signal and the second selector selects the output of the subtractor. When the comparator finds that the input luminance signal is larger than the threshold value, the first selector selects the output of the NOT gate and the second selector selects the output of the adder.

With the above arrangement, black level adjustment and white level adjustment can be realized, and a single ROM can be used for both the black level adjustment and the white level adjustment. As a result, the total capacity of the ROM can be reduced.

The apparatus may further include a second multiplier and a second adder. The second multiplier multiplies the output of the first selector with an adjustment start point control signal supplied from the outside, and the second adder adds the output of the first selector to the output of the second multiplier. The output of the second adder is input to the ROM so as to control an adjustment start point.

With the above arrangement, the adjustment start point (the upper limit of the range of the black level adjustment, or the lower limit of the range of the white level adjustment) can be controlled.

In this case, a third selector may additionally be provided to receive a first control signal for the black level adjustment and a second control signal for the white level adjustment as the adjustment start point control signal, and select one of them in accordance with the result of the comparison at the comparator. The adjustment start point for each of the black level and the white level can thereby be controlled individually and independently.

For instance, when the comparator finds that the input luminance signal is not larger than the threshold value, the third selector selects the first control signal for the black level adjustment, while when the comparator finds that the input luminance signal is larger than the threshold value, the third selector selects the second control signal for the white level adjustment.

A fourth selector may further be provided to receive a first weighting signal for the black level adjustment and a second weighting signal for the white level adjustment, as the weighting signal supplied from the outside, and select one of them in accordance with the result of the comparison at the comparator. The weighting for each of the black level and the white level can thereby be controlled individually and independently.

For instance, when the comparator finds that the digitized input luminance signal is not larger than the threshold value, the fourth selector selects the first weighting signal for the black level adjustment, while when the comparator finds that the digitized input luminance signal is larger than the threshold value, the fourth selector selects the second weighting signal for the white level adjustment.

A fifth selector may further be provided to select the weighting signal supplied from the outside and a fixed value, in accordance with the control signal supplied from the outside. Whether the adjustment is to be made or not can thereby be controlled.

For instance, the fixed value represents a value zero, and when the adjustment should not be made, the fifth selector selects the fixed value, while when the adjustment is to be made, the fifth selector selects the weighting signal.

According to another aspect of the invention, there is provided a video processing method including the steps of:
(a) comparing a digitized input luminance signal with a threshold value;
(b) inputting the input luminance signal and an inversion of the input luminance signal, and selecting one of them in accordance with the result of the comparison at the step (a);

(c) inputting the signal generated at the step (b) into a ROM, to obtain an adjustment characteristic signal from the ROM;

(d) multiplying the adjustment characteristic signal generated at the step (c) with a weighting signal supplied from the outside, to produce an adjustment value;

(e) determining the difference between the input luminance signal and the signal generated at the step (d) when it is found that the input luminance signal is not larger than the threshold value, and limiting the maximum and minimum thereof to obtain an output luminance signal; and (f) determining the sum of the input luminance signal and the signal generated at the step (d) when it is found that the input luminance signal is larger than the threshold value, and limiting the maximum and minimum thereof to obtain an output luminance signal.

At least one of black and white levels of the input luminance signal is adjusted.

In the step (b), for instance, the input luminance signal is selected when it is found that input luminance signal is not larger than the threshold value and the difference determined at the step (e) is used to form an output luminance signal, while the inversion of the input luminance signal is selected when it is found that the input luminance signal is larger than the threshold value and the sum determined at the step (f) is used to form an output luminance signal.

With the above arrangement, black level adjustment and white level adjustment can be realized, and a single ROM can be used for both the black level adjustment and the white level adjustment. As a result, the total capacity of the ROM can be reduced.

The method may further include the steps of:

(g) multiplying the signal generated at the step (b) with an adjustment start point control signal supplied from the outside;

(h) adding the signal generated at the step (b) to the signal generated at the step (g); and (i) limiting the maximum value of the signal generated at the step (h).

The signal generated at the step (i) is used as the input to the ROM so as to control the adjustment start point.

In this case, the method may additionally include the step (k) of inputting a first control signal for the black level adjustment and a second control signal for the white level adjustment as the adjustment start point control signal, and selecting one of them in accordance with the result of comparison at the step (a). The adjustment start point for each of the black level and the white level can thereby be controlled individually and independently.

For instance, when it is found that the input luminance signal is not larger than the threshold value, the first control signal for the black level adjustment is selected, while when it is found that the input luminance signal is larger than the threshold value, the second control signal for the white level adjustment is selected.

The method may further include the step of (l) inputting a first weighting signal for the black level adjustment and a second weighting signal for the white level adjustment, as the weighting signal supplied from the outside, and selecting one of them in accordance with the result of the comparison at the step (a). The weighting for each of the black level and the white level can thereby be controlled individually and independently.

For instance, when it is found that the input luminance signal is not larger than the threshold value, the first weighting signal for the black level adjustment is selected, while when it is found that the input luminance signal is larger than the threshold value, the second weighting signal for the white level adjustment is selected.

The method may further include the step of (m) inputting the weighting signal supplied from the outside and a predetermined fixed value, and selecting one of them in accordance with the control signal supplied from the outside. Whether the adjustment is to be made or not can thereby be controlled.

For instance, the predetermined fixed value represents a value zero, and when the adjustment should not be made, the fixed value is selected, while when the adjustment is to be made, the weighting signal is selected.

BRIEF DESCRIPTION OF THE DRAWINGS

In the attached drawings:

FIG. 13 is a table showing the relationship between adjustment start point control signals of 4 bits and adjustment start points.

DETAILED DESCRIPTION OF THE INVENTION

Figure 1:
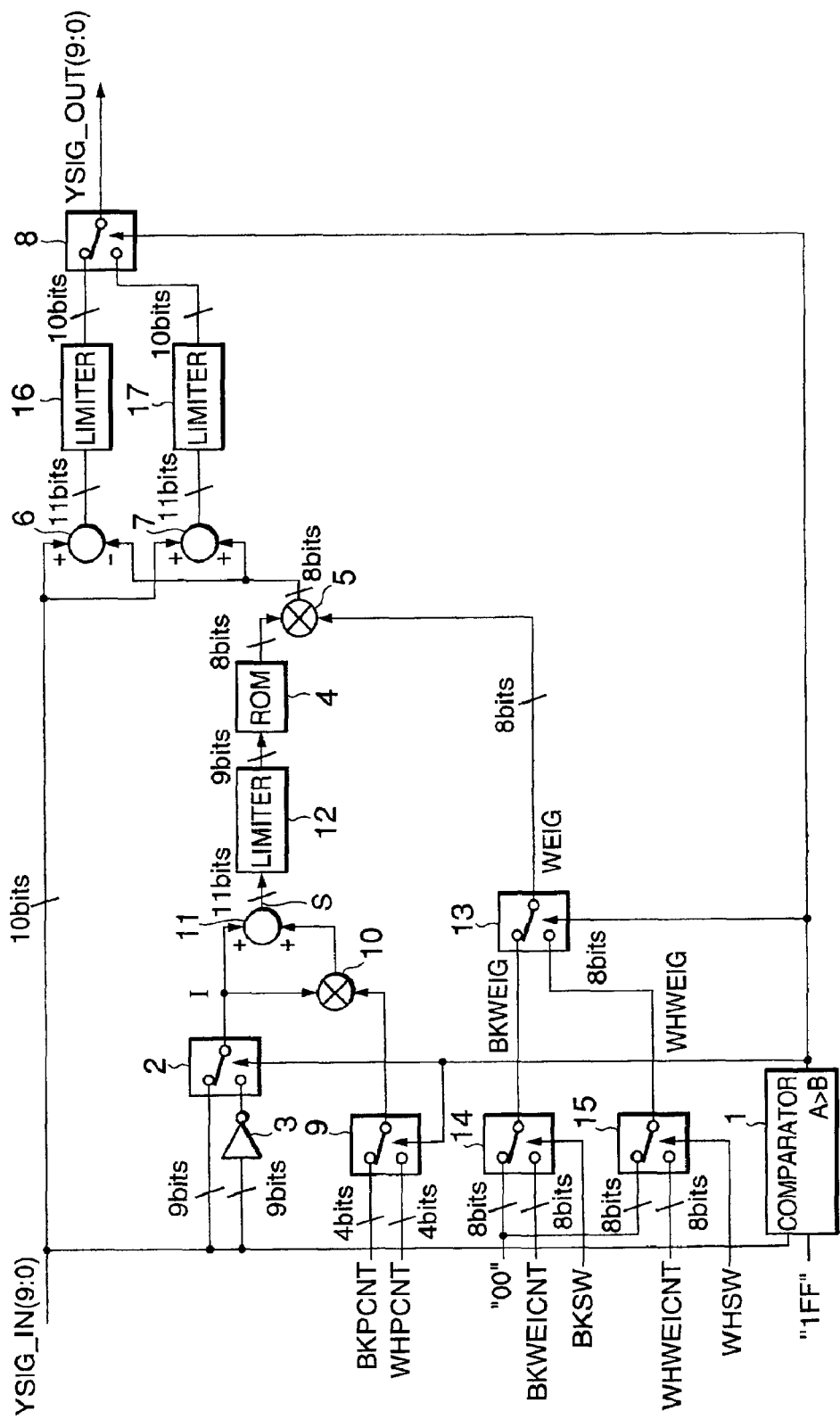
FIG. 1 is a block diagram showing the circuit configuration of the video processing apparatus of Embodiment 1 according to the present invention.

Embodiments of the invention will be described with reference to the attached drawings, in which like parts are indicated by like reference characters. To distinguish different types of numerical values, binary values will be enclosed in single quotation marks, and hexadecimal values in double quotation marks. For example, '10' is binary and "7F" is hexadecimal.

Embodiment 1.

FIG. 1 shows a video processing apparatus of Embodiment 1 according to the present invention. The illustrated video processing apparatus a comparator 1, a first selector 2, a NOT gate 3, a ROM (read-only memory) 4 used as a look-up table, a first multiplier 5, a subtractor 6, a first adder 7, a second selector 8, a third selector 9, a second multiplier 10, a second adder 11, a first limiter 12, a fourth selector 13, a fifth selector 14, a sixth selector 15, a second limiter 16, and a third limiter 17, which are interconnected as illustrated.

In FIG. 1, a digitized 10-bit input luminance signal YSIG_IN is input to the comparator 1. The comparator 1 compares the 10-bit input luminance signal YSIG_IN with a predetermined fixed value (corresponding to "1FF" (corresponding to 50 [IRE])). When the input luminance signal YSIG_IN is larger than "1FF" (i.e., in the range in which white level adjustment is made in FIG. 12), the output signal at the terminal (A>B) is '1.' When the input luminance signal YSIG_IN is not larger than "1FF" (i.e., in the range in which black level adjustment is made in FIG. 12), the output signal at the terminal (A>B) is '0.' The output of the comparator 1 is supplied to the first selector 2, the second selector 8, the third selector 9, and the fourth selector 13.

Of the 10-bit input luminance signal YSIG_IN, the lower 9 bits are input to the first selector 2 and the NOT gate 3. The NOT gate 3 inverts each of the input 9 bits, and the inverted signal is supplied to the first selector 2. The first selector 2 selects one of the two inputs in accordance with the output of the comparator 1. That is, it selects the lower 9 bits of the input luminance signal (non-inverted signal) when the output of the comparator 1 is '0,' and selects the output of the NOT gate 3 when the output of the comparator 1 is '1.' The first selector 2 supplies the selected signal to the second multiplier 10 and the second adder 11.

A black level adjustment start point control signal BKPCNT and a white level adjustment start point control signal WHPCNT that are input from the outside (of the apparatus) are input to a third selector 9. The third selector 9 selects one of the two inputs in accordance with the output of the comparator 1. That is, it selects the black level adjustment start point control signal BKPCNT when the output of the comparator 1 is '0,' and selects the white level adjustment start point control signal WHPCNT when the output of the comparator 1 is '1.' The third selector 9 supplies the selected signal to the second multiplier 10.

The second multiplier 10 multiplies the 9-bit output of the first selector 2 by the 4-bit output of the third selector 9, and supplies the upper 10 bits of the result of the multiplication, to the second adder 11.

The second adder 11 adds the 9-bit output of the first selector 2 to the 10-bit output of the second multiplier 10, and supplies a resultant 11-bit signal to the limiter 12. The limiter 12 supplies a 9-bit signal to the ROM 4.

The ROM 4 receives the 9-bit output of the limiter 12 as an address, and generates 8-bit data from a corresponding memory location designated by the address. The output of the ROM 4 is sent to the multiplier 5.

An 8-bit fixed value "0" and an 8-bit black level weighting signal BKWEICNT supplied from the outside are input to the fifth selector 14. The fifth selector 14 selects one of the two inputs in accordance with a black level adjustment switching signal BKSW supplied from the outside, and supplies the selected signal to the fourth selector 13.

The above-mentioned 8-bit fixed value "0" and an 8-bit white level weighting signal WHWEICNT supplied from the outside are input to the sixth selector 15. The sixth selector 15 selects one of the two inputs in accordance with a white level adjustment switching signal WHSW supplied from the outside, and supplies the selected signal to the fourth selector 13.

The fourth selector 13 selects one of the two inputs in accordance with the output of the comparator 1. That is, it selects the signal from the fifth selector 14 when the output of the comparator 1 is '0,' and selects the signal from the sixth selector 15 when the output of the comparator 1 is '1.' The fourth selector 13 supplies the selected signal (8-bit signal) to the first multiplier 5.

The multiplier 5 receives the output of the fourth selector 13 as a signal for controlling the weight of the black level or white level, and multiplies it by the output of the ROM 4. Since the inputs to the multiplier 5 are both of 8 bits, the result of the multiplication will be 16 bits. However, in the instant circuit, the upper 8 bits are used and sent to the subtractor 6 and the first adder 7.

The subtractor 6 subtracts the output of the multiplier 5 from the 10-bit input luminance signal YSIG_IN, and the limiter 16 limits the minimum value of the output of the subtractor 6, and supplies the limited signal to the second selector 8. The first adder 7 adds the output of the multiplier 5 to the 10-bit input luminance signal YSIG_IN, and the limiter 17 limits the maximum value of the output of the first adder 7, and supplies the limited output to the second selector 8.

The second selector 8 selects one of the two inputs in accordance with the output of the comparator 1. That is, it selects the output of the limiter 16 when the output of the comparator 1 is '0,' and selects the output of the limiter 17 when the output of the comparator 1 is '1.' The second selector 8 outputs the selected signal as an adjusted output luminance signal YSIG_OUT.

Figure 2A:
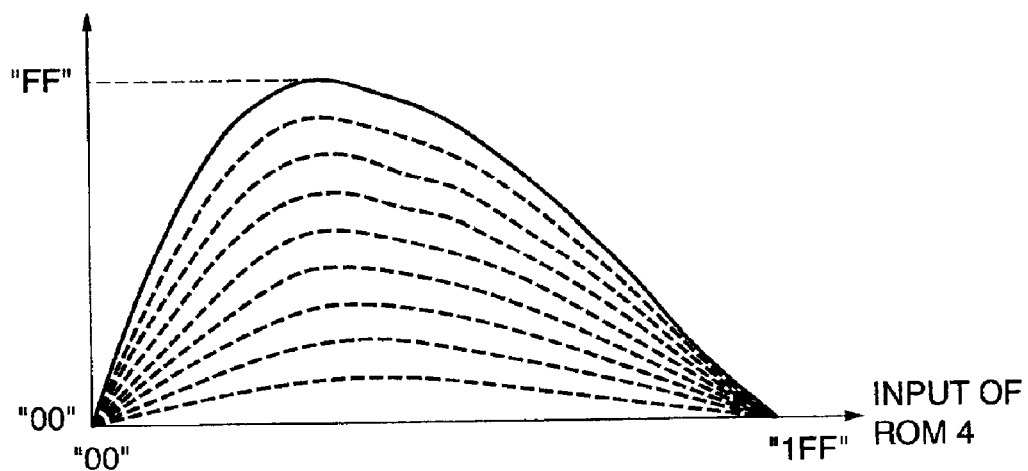
FIG. 2A is a diagram showing the relationship between the input and output of a ROM in the video processing apparatus of Embodiment 1.

The solid line in FIG. 2A illustrates the input-output characteristics (adjustment characteristics) of the ROM 4. As illustrated, in the range from "0" to "1FF" of the input, the output varies. That is, when the input is "0," the output (adjustment amount) is "0." The adjustment amount increases gradually with increase in the input, and reaches "FF," which is a maximum of an 8-bit value, and then gradually decreases with further increase in the input, and returns to "00" when the input reaches "1FF." The output of the ROM 4 serves as a basis for the adjustment amount, as will be later described in detail. That is, by multiplying the output of the ROM 4 by a coefficient or a weighting control signal having a value not larger than unity (1), the adjustment amount shown by the solid line or dotted lines in FIG. 2A can be obtained, as described later. When the weighting control signal has a value equal to unity (1), the adjustment amount will be as indicated by the solid line in FIG. 2A. When the weighting control signal is smaller than unity (1), the adjustment amount will be as shown by one of the plurality of dotted lines in FIG. 2A. As the weighting control signal becomes smaller, the adjustment amount will be the one indicated by a lower characteristic curves.

As has been described, the first selector 2 operates in accordance with the output of the comparator 1, and selects the lower 9 bits of the input luminance signal YSIG_IN (non-inverted signal) when the output of the comparator 1 is '0,' and selects the inverted signal from the NOT gate 3 when the output of the comparator 1 is '1.' By such selection, the ROM 4 outputs the values corresponding to "00" to "FF" for the purpose of the black level adjustment. For the purpose of the white level adjustment, (the order of) the signal input as the address to the ROM 4 is reversed, and the ROM 4 outputs the values corresponding to "FF" to "00."

Figure 2B:
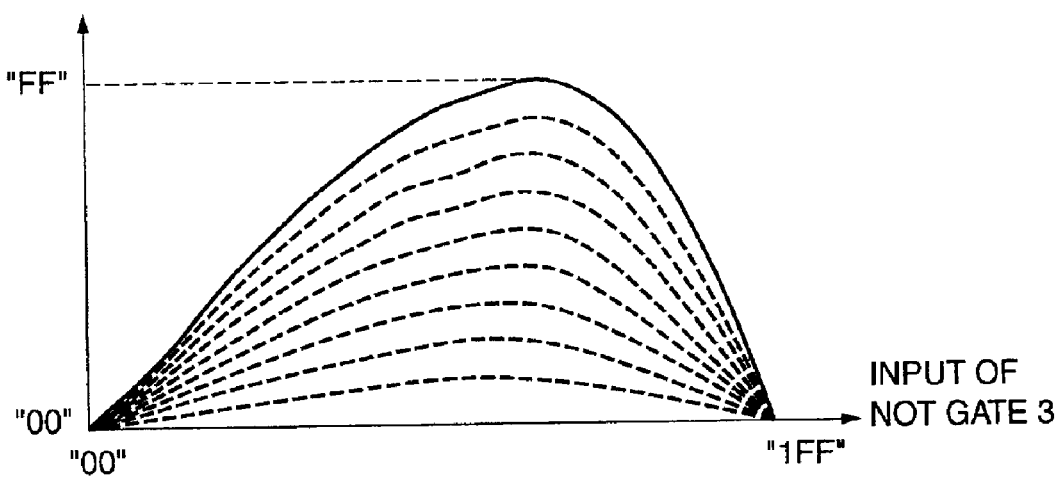
FIG. 2B is a diagram showing the relationship between the 9-bit signal before inversion at a NOT gate and the signal output from the ROM, when the output of the NOT gate is selected by a first selector.

In other words, when the first selector 2 selects the output of the NOT gate 3, (and if the multiplier 10, the adder 11, and the limiter 12 are not provided,) the relationship between the 9-bit signal before inversion by the NOT gate and the signal output from the ROM 4 is as shown in FIG. 2B. On the other hand, when the first selector 2 selects the lower 9 bits of the input luminance signal YSIG_IN, (and if the multiplier 10, the adder 11, and the limiter 12 are not provided as was previously assumed,) the relationship between the 9-bit signal before inversion by the NOT gate and the signal output from the ROM 4 is as shown in FIG. 2A. The functions of the multiplier 10, the adder 11, and the limiter 12 will be described later.

As described above, the multiplier 5 multiplies the output signal from the ROM 4 by the 8-bit signal (weighting signal) for controlling the weight, output from the fourth selector 13, and takes the upper 8 bits of the result of the multiplication, to thereby vary the height of the adjustment curve shown in FIG. 2A or FIG. 2B. When the value of the 8-bit signal for controlling the weight is maximum, the output illustrated by the solid-line curve (with their peaks at "FF") in FIG. 2A or FIG. 2B is obtained, and by gradually reducing the value of the signal for controlling the weight, the amount of adjustment is reduced gradually, as shown by dotted lines in FIG. 2A or FIG. 2B. In this way, the maximum value of the adjustment curve can assume the value from "FF" to "00," as represented by the plurality of curves.

As described above, the black level adjustment signal obtained by subtracting, at the subtractor 6, the output of the multiplier 5 from the input luminance signal YSIG_IN is supplied to the limiter 16, where the minimum value of the input is limited to "00." That is, when the input of the limiter 16 is smaller than "00," its output will be "00."

On the other hand, the white level adjustment signal obtained by adding, at the first adder 7, the output of the multiplier 5 to the input luminance signal YSIG_IN is supplied to the limiter 17, where the minimum value of the input is limited to "3FF." That is, when the input of the limiter 16 is larger than "3FF," its output will be "3FF."

Figure 12:
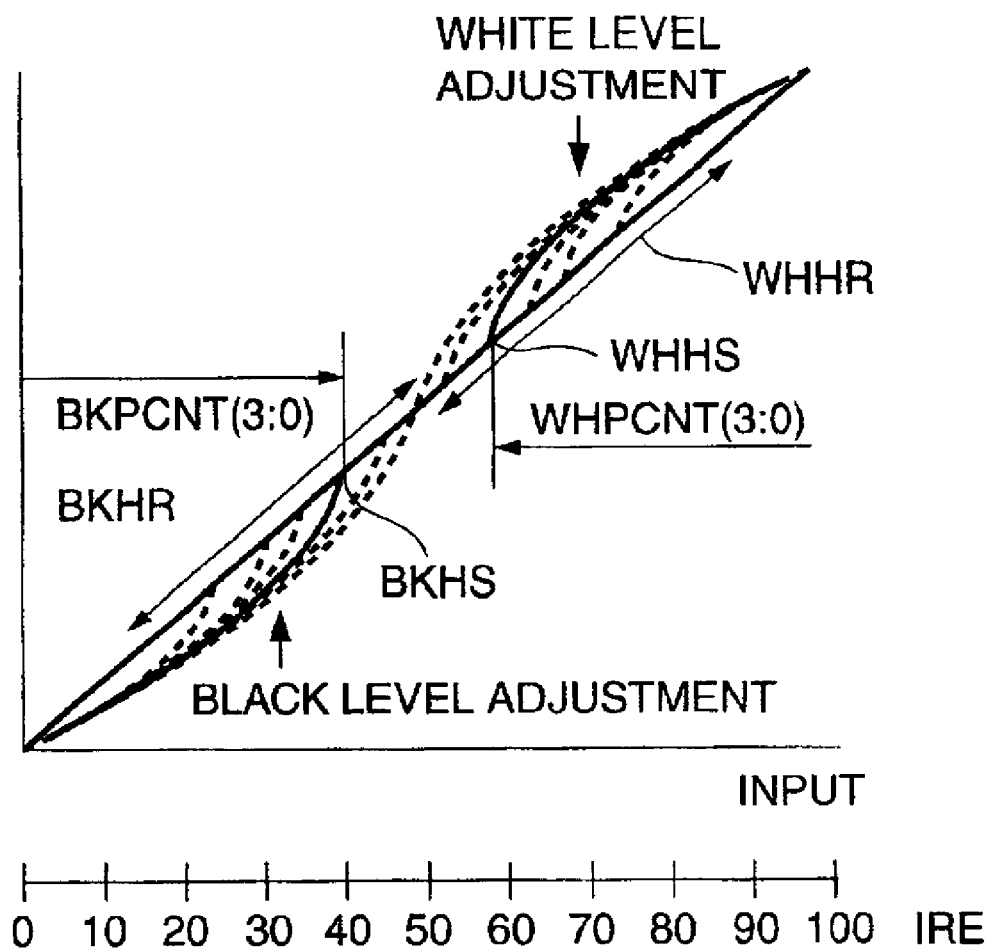
FIG. 12 is a diagram showing the input-output characteristics of the black level and white level adjustment.

As described above, the second selector 8 selects the output of the limiter 16, which is a black-level-adjusted signal, when the output of the comparator 1 is '0,' (input signal is not larger than 50 [IRE]) and selects the output of the limiter 17, which is a white-level-adjusted signal, when the output of the comparator 1 is '1,' (input signal is larger than 50 [IRE]). In this way, an output luminance signal whose black and white levels have both been adjusted as shown in FIG. 12 can be obtained by the use of the single ROM 4.

Next, the functions of the multiplier 10, the adder 11, and the limiter 12 will be described.

The second multiplier 10 multiplies the 9-bit output from the first selector 2 by the 4-bit adjustment start point control signal supplied from the third selector 9, and supplies the upper 10 bits of the 13-bit calculation result, to the second adder 11. The second adder 11 adds the 9-bit output from the first selector 2 to the output of the multiplier 10, and outputs an 11-bit signal, to the limiter 12.

The 4-bit adjustment start point control signal (BKPCNT or WHPCNT) supplied from the outside can assume a value of n=0, 1, ..., 15 (by decimal notation), and, if the output of the first selector 2 is denoted by I, the output S of the second adder 11 is given by the following formula (1).

$$S=I(1+n/8) \quad (1)$$

Figures 3A, 3B:
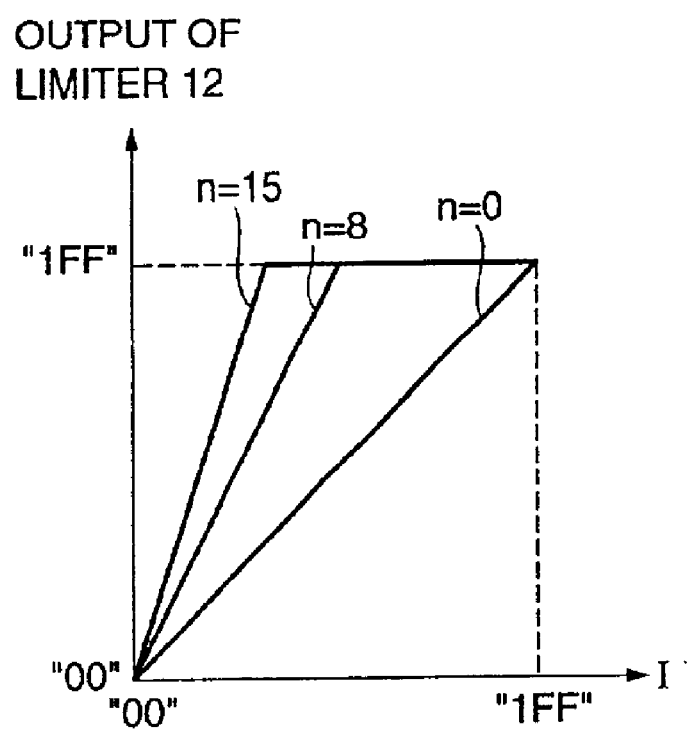
FIG. 3A is a diagram showing the relationship between the output I of the first selector and the output of a limiter.
FIG. 3B is a diagram showing the relationship between the output I of the first selector and the output of the ROM.
Figure 4A:
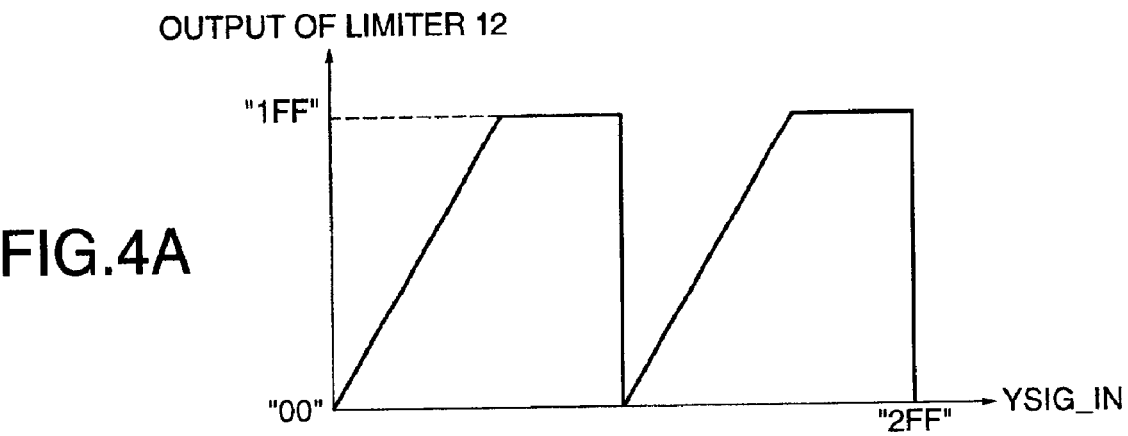
FIG. 4A is a diagram showing the relationship between the input luminance signal YSIG_IN and the output of a limiter, which would result if the lower 9 bits of the input luminance signal were kept selected by the selector.
Figure 4B:
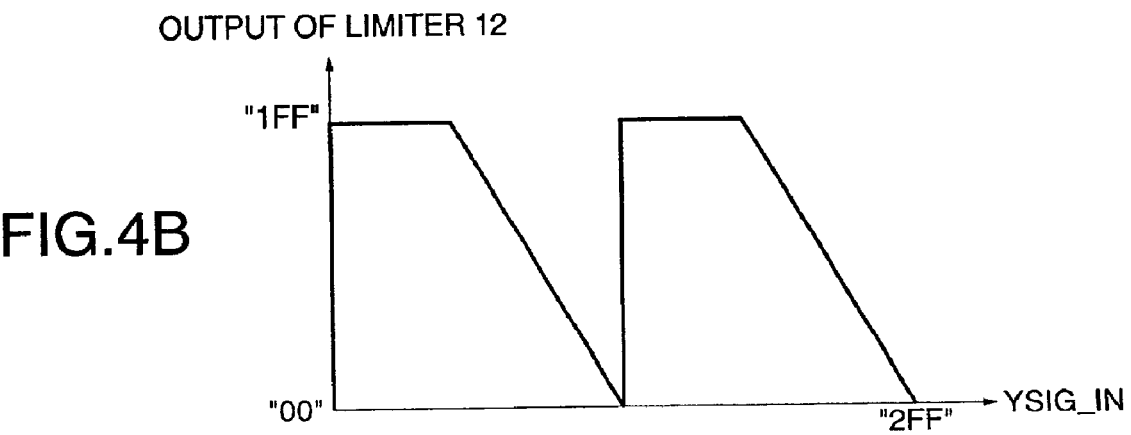
FIG. 4B is a diagram showing the relationship between the input luminance signal YSIG_IN and the output of the limiter, which would result if the output of the NOT gate were kept selected by the selector.
Figure 5A:
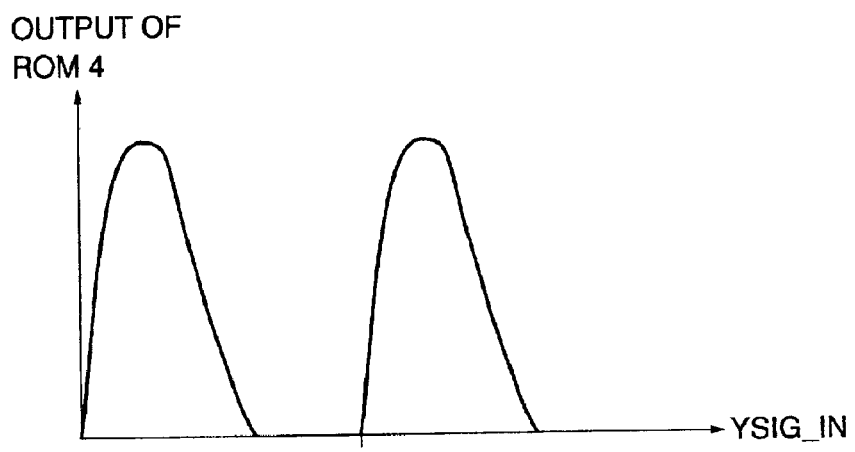
FIG. 5A is a diagram showing the relationship between the input luminance signal YSIG_IN and the output of the ROM, which would result if the lower 9 bits of the input luminance signal were kept selected by the selector.
Figure 5B:
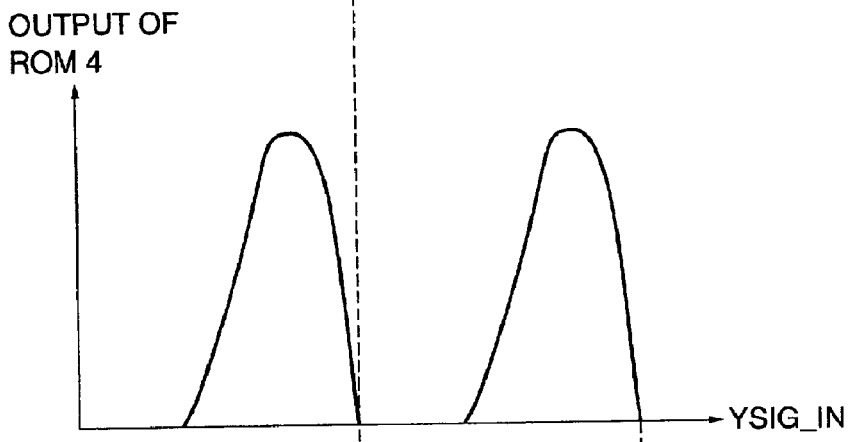
FIG. 5B is a diagram showing the relationship between the input luminance signal YSIG_IN and the output of the ROM, which would result if the output of the NOT gate were kept selected by the selector.

The limiter 12 receives the output of the second adder 11, and limits its maximum to "1FF." That is, when the input exceeds "1FF" the output is "1FF." As a result, the output of the limiter 12 against the output I of the first selector 2 is as shown in FIG. 3A. The output of the ROM 4 against the output I of the first selector 2 is as shown in FIG. 3B. As shown in FIG. 3B, the width of the curve (the range from the start of rising to the end of falling of the curve) varies with the value of n. As the value of n increases, the width of the curve decreases. As a result, the output of the limiter 12 against the input luminance signal YSIG_IN would be as shown in FIG. 4A, if the selector 2 kept selecting the lower 9 bits of YSIG_IN, and would be as shown in FIG. 4B if the selector 2 kept selecting the output of the NOT gate 3. For this reason, the output of the ROM 4 against the input luminance signal YSIG_IN would be as shown in FIG. 5A, if the selector 2 kept selecting the lower 9 bits of YSIG_IN, and would be as shown in FIG. 5B if the selector 2 kept selecting the output of the NOT gate 3.

Figure 4C:
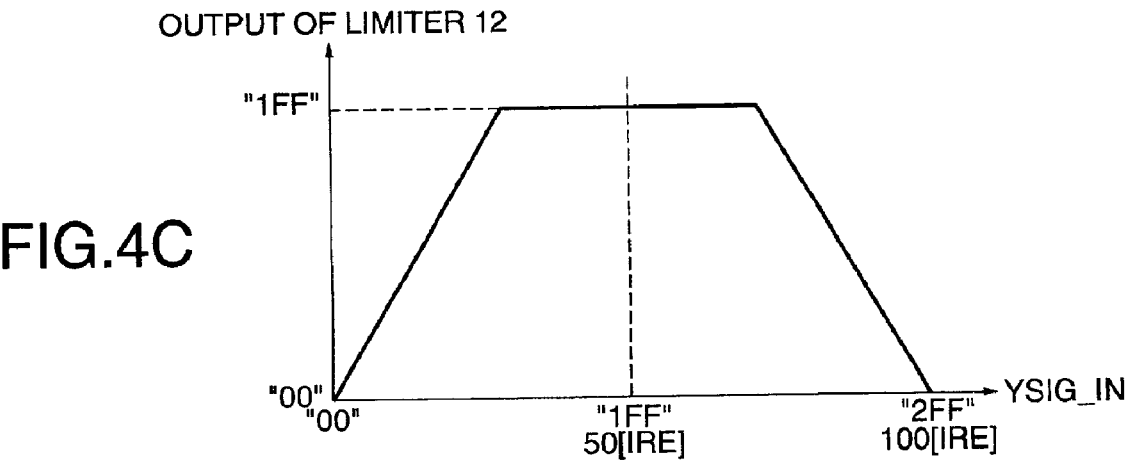
FIG. 4C is a diagram showing the relationship between the input luminance signal YSIG_IN and the output of the limiter, which results if the lower 9 bits of the input luminance or the output of the NOT gate are selected by the selector in accordance with the result of the comparison between the input luminance signal YSIG_IN and a threshold value.
Figure 5C:
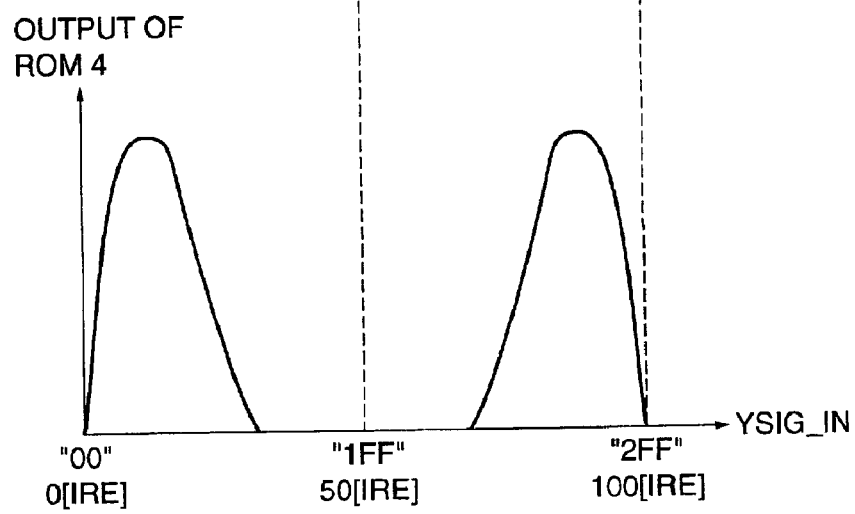
FIG. 5C is a diagram showing the relationship between the input luminance signal YSIG_IN and the output of the ROM, which results if the lower 9 bits of the input luminance or the output of the NOT gate are selected by the selector in accordance with the result of the comparison between the input luminance signal YSIG_IN and the threshold value.

As described earlier, the output of the NOT gate is selected when the input luminance signal YSIG_IN is larger than the fixed value "1FF," and the lower 9 bits of the input luminance signal YSIG_IN are selected when the input luminance signal YSIG_IN is not larger than "1FF." Accordingly, the output of the limiter 12 against the input luminance signal YSIG_IN is as shown in FIG. 4C, and the output of the ROM 4 against the input luminance signal YSIG_IN is as shown in FIG. 5C.

When the input luminance signal YSIG_IN is not larger than "1FF," the result of the subtraction at the subtractor 6 (as limited by the limiter 16) is selected by the selector 8, while the result of the addition at the adder 7 (as limited at the limiter 17) is selected by the selector 8 when the input luminance signal YSIG_IN is larger than "1FF." As a result, the output YSIG_OUT against the input luminance signal YSIG_IN is as shown in FIG. 12.

In the input-output characteristic curves shown in FIG. 12, by adjusting the adjustment start point control signals BKPCNT and WHPCNT, the control start points BKHS and WHHS can be varied over the ranges BKHR and WHHR, respectively. The relationship between the adjustment start point control signals BKPCNT and WHPCNT (4 bits) and the adjustment start points BKHS and WHHS are as shown in Table 1 shown in FIG. 13.

The function of the third selector 9 will next be described. The third selector 9 selects the black level adjustment start point control signal (BKPCNT) or the white level adjustment start point control signal (WHPCNT) in accordance with the output of the comparator 1. That is, it selects the black level adjustment start point control signal (BKPCNT) when the output of the comparator 1 is '0' (the input signal is not larger than 50 [IRE]), and selects the white level adjustment start point control signal (WHPCNT) when the output of the comparator 1 is '1' (the input signal is larger than 50 [IRE]). In this way, the adjustment start points of the black level adjustment and the white level adjustment can be controlled individually and independently.

Next, the function of the fourth selector 13 will be described. The fourth selector 13 selects the black level weighting signal (BKWEICNT or "00") output from the selector 14 or the white level weighting signal (WHWEICNT or "00") output from the selector 15 in accordance with the output of the comparator 1. That is, it selects the black level weighting signal (BKWEICNT or "00") when the output of the comparator 1 is '0' (input signal is not larger than 50 [IRE]), and selects the white level weighting signal (WHWEICNT or "00") when the output of the comparator 1 is '1' (the input signal is larger than 50 [IRE]). In this way, the weighting on the black and white levels can be controlled individually and independently.

Next, the functions of the fifth selector 14 and the sixth selector 15 will be described. The fifth selector 14 and the sixth selector 15 respectively select one of a fixed value "00" and the weighting signal (BKWEICNT or WHWEICNT) in accordance with the control signals BKSW and WHSW, respectively, supplied from the outside. That is, they select the fixed value "00" when the control signal (BKSW or WHSW) is '0,' and selects the weighting signal when the control signal (BKSW or WHSW) is '1.' When the fixed value "00" is selected, the output of the multiplier 5, which is the adjustment signal, is also "00," so that no adjustment is made. When the weighting signal is selected, the adjustment signal having a level corresponding to the weighting signal BKWEICNT or WHWEICNT is output from the multiplier 5, so that adjustment is made.

In the above-described embodiment, the input luminance signal and the output luminance signal are of 10 bits, and the input to the ROM 4 is of 9 bits, and the output of the ROM 4 is of 8 bits. However, the number of bits of each signal is not limited to that described above. However, when the input luminance signal is of M bits, a NOT gate 3 which inverts the lower (M-1) bits of the input luminance signal, and a selector 2 which selects one of the lower (M-1) bits of the input luminance signal and the output of the NOT gate 3 should be used.

In the above-described embodiment, the input of the ROM 4 is of 9bits, and the output of the ROM 4 is of 8 bits. However, the output of the ROM 4 may be of 7 bits. In this case, the step size of the adjustment will be larger but the capacity of the ROM 4 can be reduced.

The weighting signal which is multiplied with the output of the ROM 4 at the multiplier 5 represents a value not larger than unity (1), but the weighting signal may represent a value larger than 1.

Embodiment 2.

Figure 6:
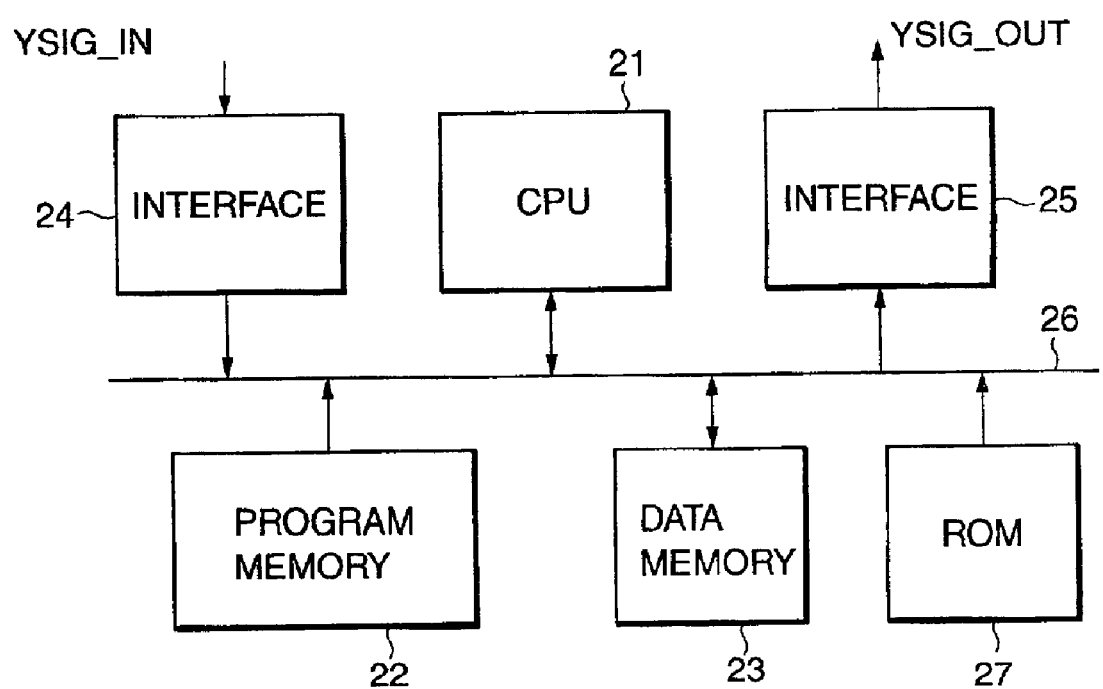
FIG. 6 is a block diagram showing the video processing apparatus of Embodiment 2 according to the present invention.

FIG. 6 shows an apparatus used for implementing a video processing method of Embodiment 2 of the present invention. As illustrated, it includes a CPU21, a program memory 22, a data memory 23, an input interface 24 for inputting the input luminance signal YSIG_IN, an output interface 25 for outputting the output luminance signal YSIG_OUT, a ROM 27, and a bus 26 for interconnecting these elements.

The CPU21 operates based on the computer programs stored in the program memory 22, and reads the input luminance signal YSIG_IN input via the input interface 24, and writes and read data from the data memory 23, and outputs the adjusted output luminance signal YSIG_OUT via the output interface 25. The input luminance signal YSIG_IN supplied to the input interface 24, and the output luminance signal YSIG_OUT output from the output interface 25 are signals of 10 bits as in Embodiment 1.

Figure 7:
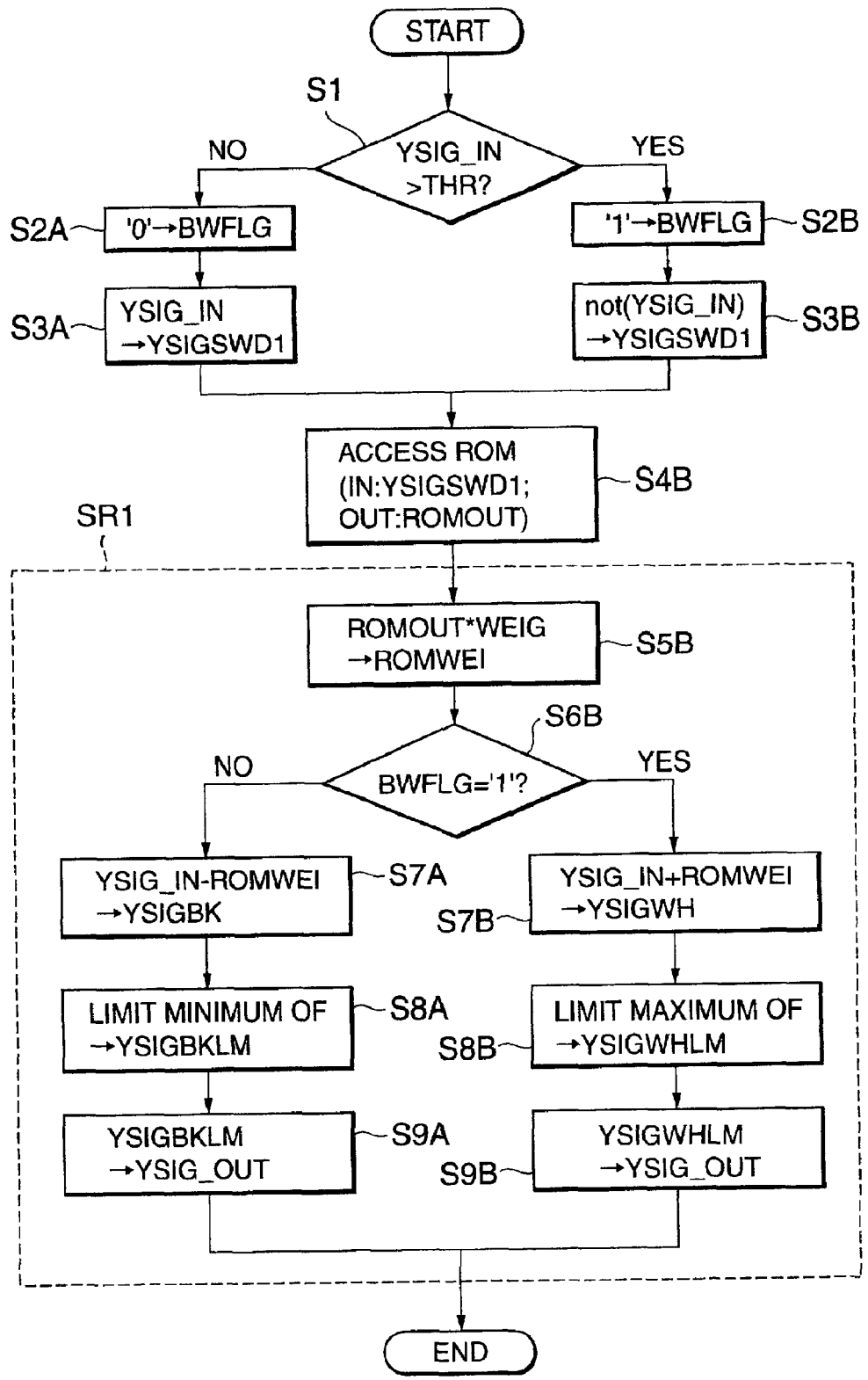
FIG. 7 is a flowchart showing the video processing method of Embodiment 2.

FIG. 7 is a flowchart showing the video processing method of Embodiment 2 implemented by the apparatus of FIG. 6. In FIG. 7, the step S1 is for comparing the input 10-bit input luminance signal YSIG_IN with a fixed value THR (e.g., "1FF"). If YSIG_IN is not larger than THR, the next step performed is step S2A, and if YSIG_IN is larger than THR, the next step performed is step S2B.

In the step S2A, a flag BWFLG is set to be '0,' and the next step performed is step S3A. In the step S2B, the flag BWFLG is set to be '1,' and the next step performed is step S3B.

The step S3A is for selecting the lower 9 bits of the 10-bit input luminance signal YSIG_IN to produce the result as a signal YSIGSWD1, and the next step performed is step S4. The step S3B is for selecting the result of inversion of the respective ones of the lower 9 bits of the 10-bit input luminance signal YSIG_IN to produce the result as a signal YSIGSWD1, and the next step performed is step S4.

In the step S4, the signal YSIGSWD1 (of 9 bits) generated at the step (S3A or S3B) is supplied to the ROM 27 as an address, and the 8 bits stored in the memory location designated by the address are read, and produced as the output signal ROMOUT. The next step performed is step S5.

In the step S5, the 8-bit signal WEIG for controlling the weighting is multiplied by the output ROMOUT from the ROM 27. The result of the multiplication is of 16 bits, but the upper 8 bits are taken to form a signal ROMWEI. The next step performed is step S6.

In the step S6, the flag BWFLG is referred to, and if it is '0' the next step performed is step S7A, and if it is '1' the next step performed is step S7B.

In the step S7A, the 8-bit signal ROMWEI is subtracted from the 10-bit input luminance signal YSIG_IN to produce the result as YSIGBK.

In the step S8A, the minimum value of the signal YSIGBK is limited, and the result is produced as YSIGBKLM.

In the step S9A, YSIGBKLM is output as the output luminance signal YSIG_OUT.

In the step S7B, the 10-bit input luminance signal YSIG_IN is added to the 8-bit signal ROMWEI, and the result is produced as YSIGWH.

In the step S8B, the maximum value of the signal YSIGWH is limited, and the result is produced as YSIGWHLM.

In the step S9B, YSIGWHLM is output as the output luminance signal YSIG_OUT.

The processes in the respective ones of the above-described steps correspond to the operations of the respective parts of the circuit in FIG. 1, and the relationship between them is as follows:

| step | circuit element in FIG. 1 |
| --- | --- |
| S1 | comparator 1 |
| S3A, S3B | selector 2 |

-continued

| step | circuit element in FIG. 1 |
| --- | --- |
| S4 | ROM 4 |
| S5 | multiplier 5 |
| S7A | subtractor 6 |
| S7B | adder 7 |
| S8A | limiter 16 |
| S8B | limiter 17 |
| S9A, S9B, S6 | selector 8 |

By the above-described embodiment, the black level and white level adjustments having characteristics as shown in FIG. 1 can be realized. Because a single ROM can be used both for the black level adjustment and the white level adjustment, the total capacity of the ROM used for implementing the method can be reduced.

In the above-described embodiment, the input luminance signal and the output luminance signal are of 10 bits, and the input and output used in the step S4 are of 9 bits and 8 bits, respectively, but the number of bits of each of these signals is not limited to that of the described example.

Embodiment 3.

Figure 8:
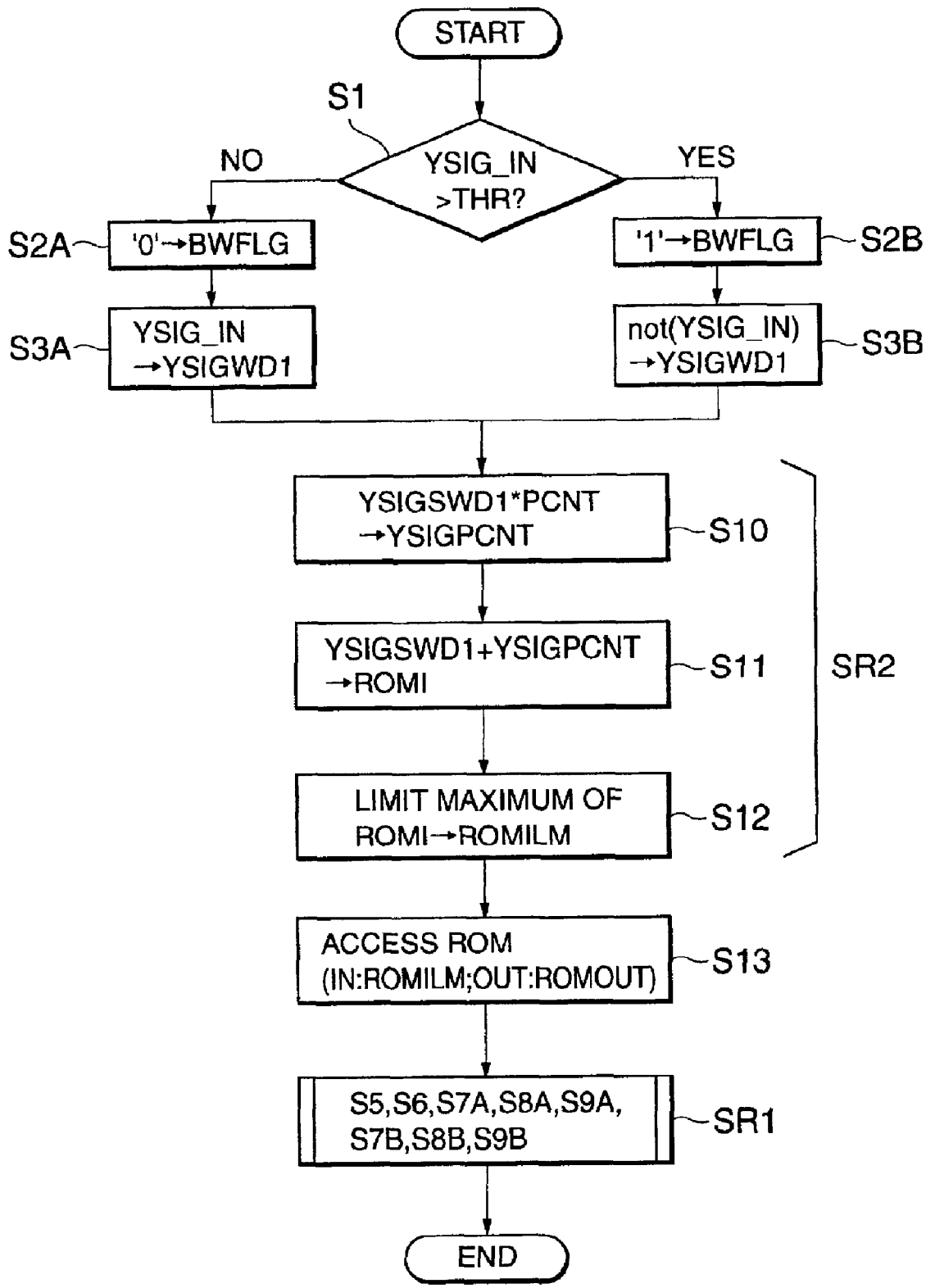
FIG. 8 is a flowchart showing the video processing method of Embodiment 3.

The hardware configuration used for implementing a video processing method of Embodiment 3 is as shown in FIG. 6. FIG. 8 is a flowchart showing the video processing method of Embodiment 3. In FIG. 8, the step SR1 is identical to the step SR1 in FIG. 7 which consists of a combination of the steps S5, S6, S7A, S8A, S9A, S7B, S8B, and S9B. The difference of FIG. 8 from FIG. 7 is that the steps S10, S11 and S12 performed after the steps S3A and S3B are added and that the step S4 in FIG. 7 has been replaced by a step S13.

The steps S1, S2A, S3A, S2B and S3B are identical to those of Embodiment 2, so that their description is omitted.

In the step S10, which is performed after the step S3A and S3B, the 9-bit signal YSIGSWD1 generated at the step S3A or S3B is multiplied by the 4-bit signal PCNT for controlling the adjustment start point PCNT. The result of the multiplication is of 13 bits, but the upper 10 bits are taken to form a signal YSIGPCNT.

In the step S11, the 9-bit signal YSIGSWD1 generated at the step S3A or S3B is added to the 10-bit signal YSIGPCNT generated at the step S10, and the 11-bit result of the addition is taken as the signal ROMI.

In the step S12, the maximum value of the 11-bit signal ROMI is limited to "1FF," and the resultant signal of 9 bits is taken as a signal ROMILM.

In the step S13, the signal ROMILM of 9 bits generated at the step S12 is input to the ROM 27 as an address, and the 8-bit data stored in the memory location designated by the address is read as an output signal ROMOUT.

The step S13 is followed by the step SR1. The processes performed in the step SR1 are identical to those of FIG. 2, so that their description is omitted.

The processes in the steps added by this embodiment correspond to operations at various parts of the circuit in FIG. 1, and the relationship between them is as follows:

| step | circuit element in FIG. 1[ |
| --- | --- |
| S10 | multiplier 10 |
| S11 | adder 11 |

| step | circuit element in FIG. 1[ |
| --- | --- |
| S12 | limiter 12 |
| S13 | ROM 4 |

In the above-described embodiment, the signal YSIGSWD1 generated at the step S3A or S3B is multiplied by the signal PCNT for controlling the adjustment start point of the black level or white level, and the result of the multiplication is added to the signal YSIGSWD1 generated at the step S3A or S3B, and the result of the addition is supplied to the table ROM, to thereby control the adjustment start point.

In the above-described embodiment, the signal YSIGSWD1 generated at the step S3A or S3B is of 9 bits, and the signal PCNT for controlling the black level and white level adjustment start points is of 4 bits, and the 10 bits of the 13-bit result of the multiplication is used for calculation in the subsequent stages, but the number of bits is not limited to that of the above-example.

Embodiment 4.

Figure 9:
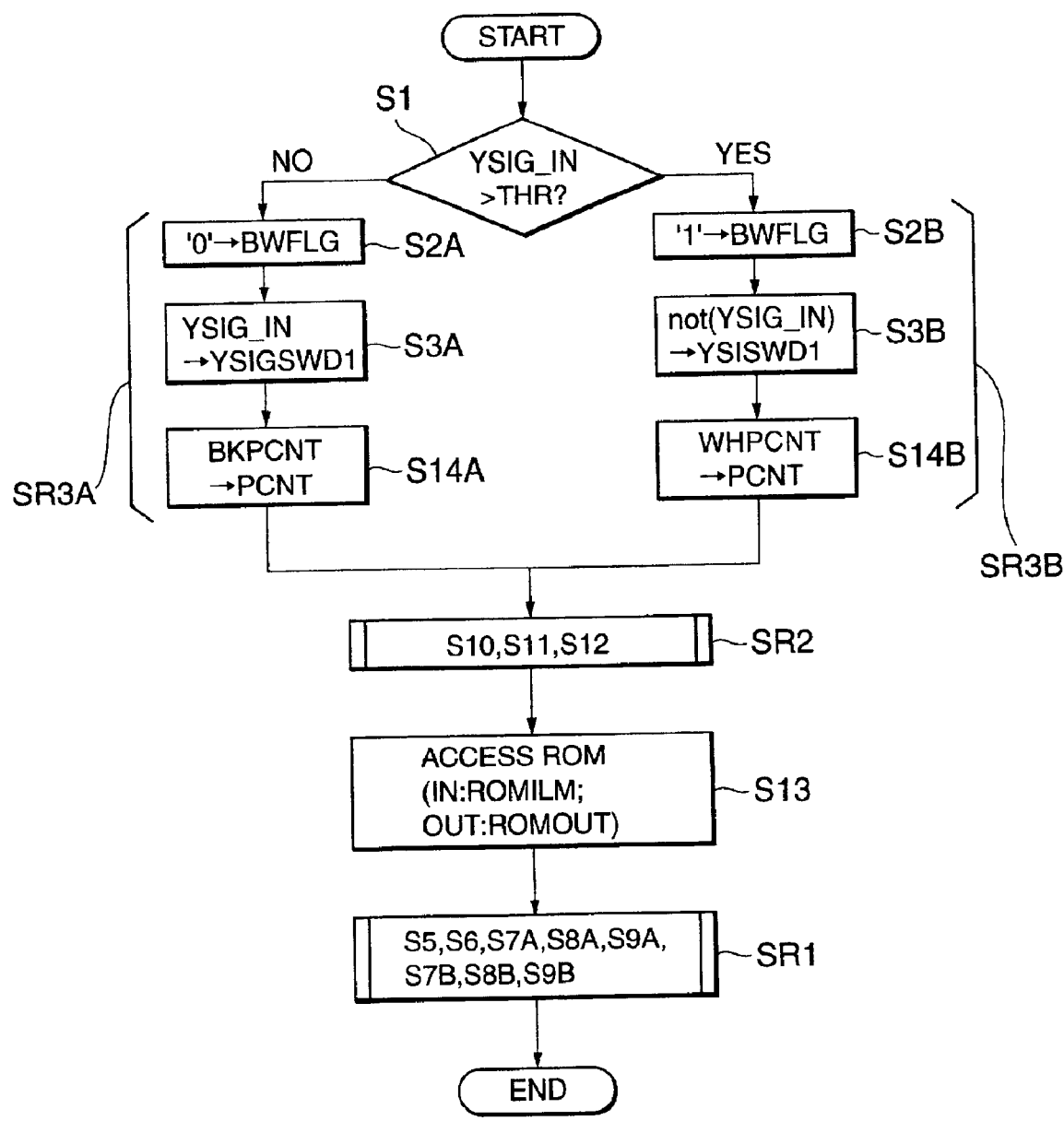
FIG. 9 is a flowchart showing the video processing method of Embodiment 4.

The hardware configuration used for implementing a video processing method of Embodiment 4 is as shown in FIG. 6. FIG. 9 is a flowchart showing the video processing method of Embodiment 4. In FIG. 9, the step SR2 is identical to the step SR2 in FIG. 8 which consists of a combination of the steps S10, S11 and S12. The difference of FIG. 9 from FIG. 8 is that steps S14A and S14B which are performed between the corresponding one of the steps S3A and S3B and the step S10 are added.

In the step S14A, which is performed after the step S3A, the black level adjustment start point control signal BKPCNT is selected as the signal PCNT, and the next step performed is the step S10. In the step S14B, the white level adjustment start point control signal WHPCNT is selected as the signal PCNT, and the next step performed is the step S10.

The steps other than the steps S14A and S14B are identical to those in Embodiment 3, so their description is omitted.

The processes of the steps S14A and S14B added by the present embodiment correspond to the operation of the selector 9 in the circuit of FIG. 1.

According to the above-described embodiment, by the steps for selecting one of the black level adjustment start point control signal BKPCNT and the white level adjustment start point control signal WHPCNT, the black level and white level adjustment start points can be controlled individually and independently.

Embodiment 5.

Figure 10:
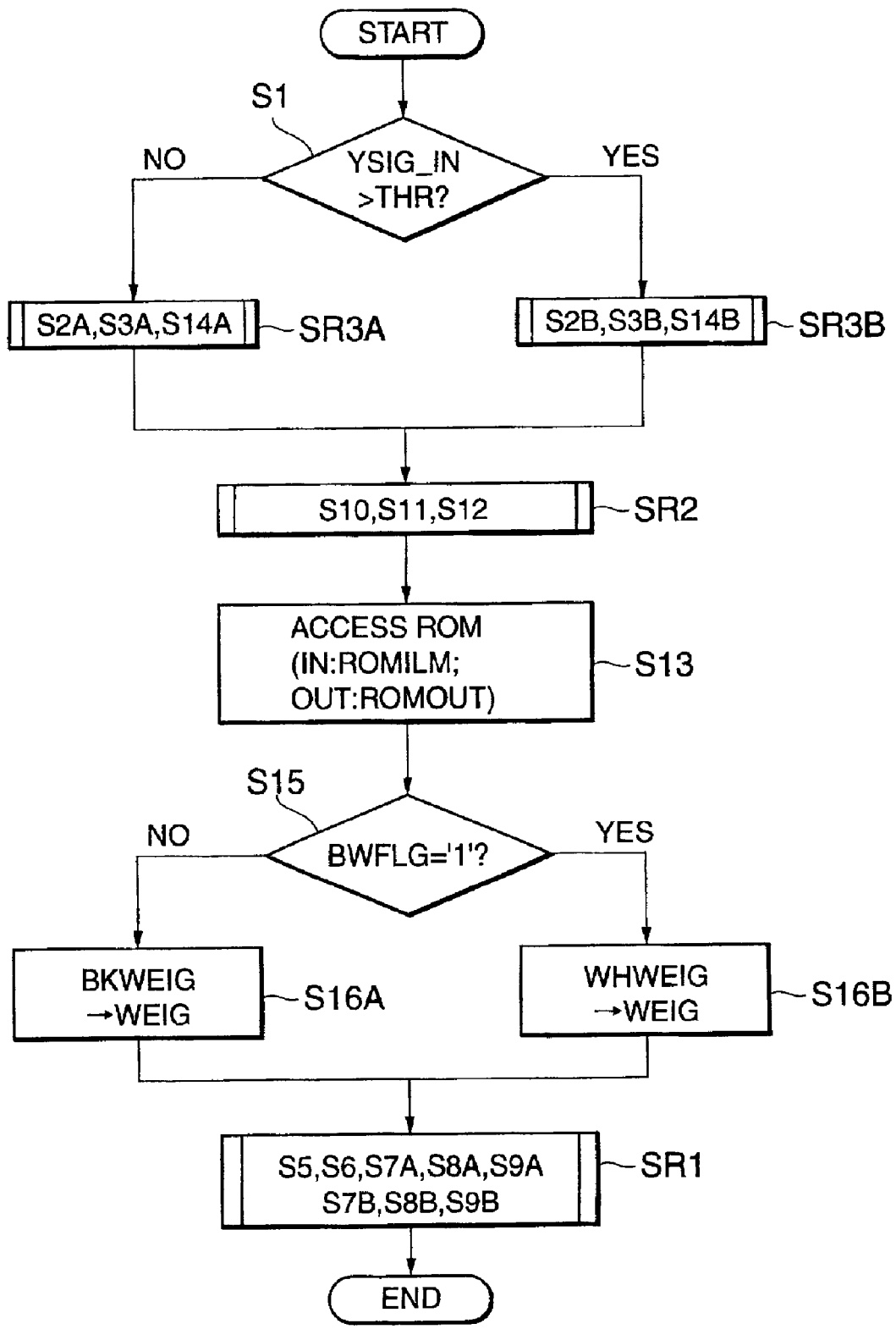
FIG. 10 is a flowchart showing the video processing method of Embodiment 5.

The hardware configuration used for implementing a video processing method of Embodiment 5 is as shown in FIG. 6. FIG. 10 is a flowchart showing the video processing method of Embodiment 5. In FIG. 10, the step SR3A is identical to the step SR3A in FIG. 9 which consists of a combination of the steps S2A, S3A and S14A, and the step SR3B is identical to the step SR3B in FIG. 9 which consists of a combination of the steps S2B, S3B and S14B. The difference of FIG. 10 from FIG. 9 is that steps S15, S16A and S16B which are performed between the steps S13 and S5 are added.

In the present embodiment, the step S13 is followed by the step S15. In the step S15, the flag BWFLG is referred to, and if it is '0' the next step performed is the step S16A, and if it is '1' the next step performed is the step S16B. In the step S16A, the black level weighting signal BKWEIG is selected as the signal WEIG and the next step performed is the step S5. In the step S16B, the white level weighting signal WHWEIG is selected as the signal WEIG, and the next step performed is the step S5.

The processes of the steps S15, S16A and S16B added by this embodiment correspond to the operation of the selector 13 in the circuit of FIG. 1.

The steps other than the steps S15, S16A and S16B are identical to those in Embodiment 4, so their description is omitted.

According to the above-described embodiment, by the steps for selecting one of the black level weighting signal BKWEICNT and the white level weighting signal WHWEICNT, the weighting for each of the black level and the white level can be controlled individually and independently.

Embodiment 6.

Figure 11:
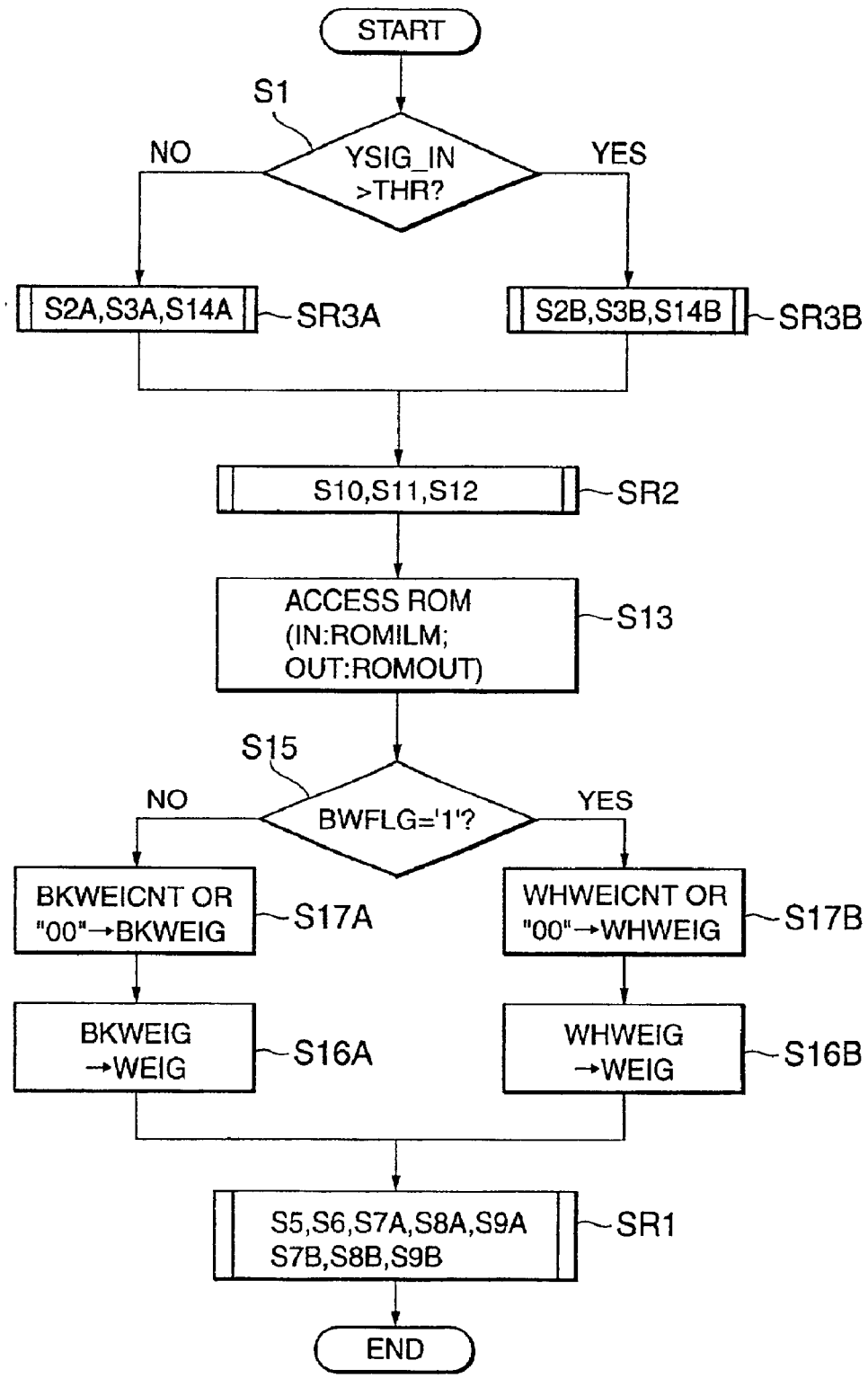
FIG. 11 is a flowchart showing the video processing method of Embodiment 6.

The hardware configuration used for implementing the video processing method of Embodiment 6 is as shown in FIG. 6. FIG. 11 is a flowchart showing the video processing method of Embodiment 6. The difference of FIG. 11 from FIG. 10 is that steps S17A and S17B which are performed between the steps S15 and the corresponding one of the steps S16A and S16B are added.

In the step S17A, BKWEICNT or "00" is selected in accordance with a one-bit control signal BKSW supplied from the outside, and the selected signal is set as the BKWEIG, and the next step performed is the step S16A. In the step S17B, WHWEICNT or "00" is selected in accordance with a one-bit control signal WHSW supplied from the outside, and the selected signal is set as the WHWEIG, and the next step performed is the step S16B.

The processes of the steps S17A and S17B respectively correspond to the operations of the selector 14 and 15 in the circuit of FIG. 1.

The steps other than the steps S17A and S17B are identical to those in Embodiment 5, so that their description is omitted.

According to the above-described embodiment, by setting the weighting signal to be a fixed value "00" based on the control signal, the result of the multiplication at the step S5 will be "00," and in this case the adjustment is not made. Thus, whether the adjustment is made or not for each of the white and black levels can be selected using the control signal.

What is claimed is:

1. A video processing apparatus including:
   a comparator for comparing a digitized input luminance signal with a predetermined threshold value;
   a NOT gate for inverting the input luminance signal;
   a first selector receiving the input luminance signal and the output of the NOT gate, and selecting one of them in accordance with the result of the comparison at the comparator;
   a ROM responsive to the signal output from the first selector, for generating an adjustment characteristic signal;
   a first multiplier for multiplying the adjustment characteristic signal from the ROM with a weighting signal supplied from the outside, to produce an adjustment value;
   a subtractor for determining the difference between the input luminance signal and the adjustment value;
   a first adder for determining the sum of the input luminance signal and the adjustment value; and
   a second selector responsive to the output of the subtractor and the output of the first adder and selecting one of them in accordance with the result of the comparison at the comparator;
   wherein at least one of black and white levels of the input luminance signal is adjusted.

2. The apparatus as set forth in claim 1, further including:
   a second multiplier for multiplying the output of the first selector with an adjustment start point control signal supplied from the outside; and
   a second adder for adding the output of the first selector to the output of the second multiplier;
   wherein the output of the second adder is input to the ROM so as to control an adjustment start point.

3. The apparatus as set forth in claim 2, further including:
   a third selector receiving a first control signal for the black level adjustment and a second control signal for the white level adjustment as said adjustment start point control signal, and selecting one of them in accordance with the result of the comparison at the comparator;
   whereby the adjustment start point for each of the black level and the white level can be controlled individually and independently.

4. The apparatus as set forth in claim 1, further including:
   a fourth selector for receiving a first weighting signal for the black level adjustment and a second weighting signal for the white level adjustment, as said weighting signal supplied from the outside, and selecting one of them in accordance with the result of the comparison at the comparator;
   whereby the weighting for each of the black level and the white level can be controlled individually and independently.

5. The apparatus as set forth in claim 1, further including:
   a fifth selector receiving the weighting signal supplied from the outside and a fixed value, and selecting one of them in accordance with the control signal supplied from the outside;
   whereby whether the adjustment is to be made or not can be controlled.

6. A video processing method including the steps of
   (a) comparing a digitized input luminance signal with a threshold value;
   (b) inputting the input luminance signal and an inversion of the input luminance signal, and selecting one of them in accordance with the result of the comparison at said step (a);
   (c) inputting the signal generated at said step (b) into a ROM, to obtain an adjustment characteristic signal from the ROM;
   (d) multiplying the adjustment characteristic signal generated at the step (c) with a weighting signal supplied from the outside, to produce an adjustment value;
   (e) determining the difference between the input luminance signal and the signal generated at the step (d) when it is found that the input luminance signal is not larger than the threshold value, and limiting the maximum and minimum thereof to obtain an output luminance signal; and
   (f) determining the sum of the input luminance signal and the signal generated at the step (d) when it is found that the input luminance signal is larger than the threshold value, and limiting the maximum and minimum thereof to obtain an output luminance signal;
   wherein at least one of black and white levels of the input luminance signal is adjusted.

7. The method as set forth in claim 6, further including the steps of:
- (g) multiplying the signal generated at said step (b) with an adjustment start point control signal supplied from the outside;
- (h) adding the signal generated at said step (b) to the signal generated at said step (g); and
- (i) limiting the maximum value of the signal generated at said step (h);
    - wherein the signal generated at said step (i) is used as said input to said ROM so as to control the adjustment start point.

8. The method as set forth in claim 7, further including the step of:
- (k) inputting a first control signal for the black level adjustment and a second control signal for the white level adjustment as said adjustment start point control signal, and selecting one of them in accordance with the result of comparison at said step (a);
    - whereby the adjustment start point for each of the black level and the white level can be controlled individually and independently.

9. The method as set forth in claim 6, further including the step of:
- (l) inputting a first weighting signal for the black level adjustment and a second weighting signal for the white level adjustment, as said weighting signal supplied from the outside, and selecting one of them in accordance with the result of the comparison at said step (a);
    - whereby the weighting for each of the black level and the white level can be controlled individually and independently.

10. The method as set forth in claim 6, further including the step of:
- (m) inputting the weighting signal supplied from the outside and a predetermined fixed value, and selecting one of them in accordance with the control signal supplied from the outside;
    - whereby whether the adjustment is to be made or not can be controlled.

* * * * *